3,810,752
PYRIDINE-N-OXIDES AS CITRUS
ABSCISSION AGENTS
Merrill Wilcox, 2911 NW. 30th Terrace,
Gainesville, Fla. 32601
No Drawing. Filed Aug. 18, 1972, Ser. No. 281,901
Int. Cl. A01n 9/22
U.S. Cl. 71—94                              5 Claims

ABSTRACT OF THE DISCLOSURE

A method of aiding in harvesting fruit wherein abscission is induced by application to the fruit bearing plant an effective amount of a compound of the formula:

wherein R and R' are independently SH, SNa, CN, H, $CH_3$, —$SO_3H$, halogen, lower alkyl, lower alkoxy, OH, or $NO_2$, carboxyalkylenes and its amides or esters.

BACKGROUND OF THE INVENTION

The ability of plants to slough off organs by an active separation of cells is distinctive to higher green plants. Plant physiologists describe this process as abscission.

As our agricultural production has become more intensified, the use of mechanical harvesters has become more and more important in agricultural production. Their use helps to keep the unit cost of production down to a reasonable level. Where hand labor is still used in harvesting crops, any practice that can help to increase the productivity of a man per unit of time, would be an important agricultural contribution.

This invention relates to the use of certain chemicals which have a positive and beneficial effect on the abscission process. They facilitate and make the harvesting of crops easier. This is a new and unique discovery and is highly important in the agricultural sector. To harvest fruit, as given in the examples above, whether it is done by hand or mechanically, a given amount of force (energy) must be applied by hand or mechanically to the fruit, or portion of the plant to be harvested, in order to force it to abscise, or come loose from the rest of the plant. It is recognized that when a great deal of force must be applied during the harvesting operation: (1) the amount of fruit harvested in a given time is reduced as compared with fruit which is more easily loosened and taken from the plant, (2) the fruit may be damaged or reduced in quality grade because of the amount of force which must be applied, (3) some fruit becomes unmarketable because of excessive damage to the fruit, and (4) the plant itself may be damaged and in the case of perennial plants such as vines or trees, this is highly undesirable; also, in the case of annual plants where multiple harvests are to be made, damage at the first or earlier pickings is undesirable and should be avoided.

Chemicals used to assist in loosening the fruit for the harvesting operation are sometimes called, in general terms, harvesting aid chemicals or fruit loosening chemicals. If the amount of force needed to separate a fruit from the rest of the plant can be reduced through the use of a chemical, this would be a significant contribution to agriculture and would be useful to farmers and growers. Such a chemical would allow pickers to pick the fruit easily and more quickly. In the case where mechanical harvesters are used, the amount of force which would have to be applied by the mechanical harvester could be reduced. More fruit per tree (per vine, or unit or row) could be harvested more easily and uniformly. Less damage to the fruit itself and to the rest of the plant would result if a chemical loosening agent effectively reduced the required harvest force. The quality of the fruit would increase because of less damage and possibly the yield per tree (per acre, or per unit of measure) would increase because of a more uniform and complete harvest. The compounds of this invention do help to loosen the fruit which is to be harvested while at the same time, they do not significantly damage the rest of the plant.

SUMMARY OF THE INVENTION

In accordance with the present invention, there is provided an improved method for inducing abscission in fruit bearing plants by application to said plant a compound of the formula:

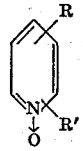

wherein R and R' are independently SH, SNa, CN, H, —$SO_3H$, halogen, lower alkyl, lower alkoxy, $CH_3$, OH, $NO_2$, carboxyalkylenes and its amides or esters. Salts of the above compounds are also useful.

DETAILS OF THE INVENTION

Abscission agents useful in the present invention are compounds of the formula

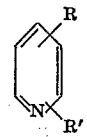

wherein R and R' are as hereinbefore defined.

Particular compounds within the scope of the present invention include, for example, 2-mercaptopyridine-N-oxide, 4 - cyano - pyridine-N-oxide, pyridine-N-oxide, 4-methyl-pyridine-N-oxide, 4-methoxy-pyridine-N-oxide, 3-hydroxy-pyride-N-oxide, 4 - nitropyridine-N-oxide, 4-sulfonic acid-pyridine-N-oxide and picolinic acid-N-oxide.

Particularly preferred compounds include 4-cyano-pyridine-N-oxide and 2-mercapto-pyridine-N-oxide.

The compounds useful as the abscission agents of the present invention are well known and are prepared in accordance with conventional techniques. Typical preparation procedures are described in Pharm. Bull. (Tokyo), volume 4, pp. 174–7 (1956).

The abscission agents of present invention are applied to the plants to be treated in a variety of conventional ways. Typical application methods include, for example, spraying aqueous solutions of the active compound.

The abscission agents of the present invention may be used alone or as mixtures and of course may be blended with conventional agricultural carriers, additives and adjuvants. The active ingredient or abscission agent of the present invention is conveniently employed in a variety of formulations such as those employing conventional adjuvants and carriers well known for use in similar agricultural applications. In choosing convenient application methods, it should be kept in mind, as is well known to those of skill in the art, that the choice of formulation and method of application may affect the degree of activity of a particular active ingredient.

The abscission agents of the present invention can, for example, be formulated as aqueous and non-aqueous solutions and dispersions, emulsifiable concentrates, dusts or wettable powders. Such formulations can contain from about 2% by weight to about 95% by weight, preferably from about 80% by weight to about 90% by weight of active abscission agent.

These various types of formulations can be prepared in accordance with procedures well known in the field of agricultural chemistry. General procedures useful, in accordance with this invention, for preparing various types of agricultural formulations such as wettable powders, emulsifiable concentrates, etc., are described in U.S. 3,410,676 to Hill.

Preferred formulations useful, in accordance with the present invention, include aqueous solutions containing about 0.1–1% by weight of a non-ionic wetting agent.

The abscission agents of this invention or formulations thereof are conveniently applied at a rate such that about ¾ lb. to about 16 lbs., preferably about 1 lb. to about 4 lbs., of abscission agent is applied per acre of plants to be treated.

The stage of growth of the plants to be treated is an important factor in the activity of the abscission agent. It is preferable, in accordance with the present invention, to apply the abscission agent when the fruit are passing commercially acceptable maturity tests.

The abscission agents of the present invention are useful with a wide variety of fruit bearing crops and are particularly useful for inducing abscission in citrus plants. Typical crops with which the abscission agents of the present invention are useful include, for example, oranges, lemons, grapefruit, limes, olives, cherries and apples.

The abscission agents of the present invention are particularly desirable in comparison to known abscission agents in that they are not phytotoxic and are highly water-soluble.

EXAMPLES

The following is illustrative of the invention: a pyridine-N-oxide was dissolved in water containing 0.5% Triton X–114® (a non-ionic surfactant manufactured by Rohm & Haas Co.) surfactant at a concentration of 4000 parts per million and sprayed to run-off on ten pineapple oranges. Other oranges were treated with the carrier solution to provide a control. Seven days later, the average pull force required to pick the oranges was measured.

| | Pull force, lbs. | |
|---|---|---|
| | Treated | Carrier-treated control |
| Pyridine-N-oxide | 0.0 | 19.6 |
| 4-cyanopyridine-N-oxide | 3.9 | 19.6 |

NOTE.—No phytotoxicity was observed in any of the preceding cases.

The following data were obtained from two replications of Hamlin oranges:

| | Pull force, lbs. | |
|---|---|---|
| | Treated | Carrier-treated control |
| 2-mercaptopyridine-N-oxide (slight phytotoxicity) | 8.7 | 21.0 |

The following data were obtained from Valencia oranges:

| | Pull force, lbs. | |
|---|---|---|
| | Treated | Carrier-treated control |
| Pyridine-N-oxide (4,000 p.p.m.) | 15.5 | 22.1 |
| 4-cyanopyridine-N-oxide (2,000 p.p.m.) | 0.0 | 22.1 |
| 4-cyanopyridine-N-oxide (4,000 p.p.m.) | 0.0 | 22.1 |

NOTE.—No phytotoxicity was observed in the three preceding cases.

Pyridine-N-oxides have utility because in contrast to known abscission agents they are not phytotoxic and are highly water-soluble.

I claim:

1. A method of aiding in the harvesting of fruit wherein abscission is induced by application to the fruit bearing plant an effective amount of a compound of the formula

wherein R is SH, CN, H, CH₃, —SO₃H, OCH₃, OH, NO₂, or carboxy.

2. The method of claim 1 wherein pyridine-N-oxide is applied to the fruit bearing plant.

3. The method of claim 1 wherein 4-cyanopyridine-N-oxide is applied to the fruit bearing plant.

4. The method of claim 1 wherein 2-mercaptopyridine-N-oxide is applied to the fruit bearing plant.

5. The method of claim 1 wherein the fruit is a citrus fruit.

References Cited

FOREIGN PATENTS 162,003    5/1963    U.S.S.R.

LEWIS GOTTS, Primary Examiner

C. L. MILLS, Assistant Examiner

U.S. Cl. X.R.

71—74